Feb. 9, 1937.                R. HENRY                 2,070,081
                          BEARING SUPPORT
                        Filed July 29, 1935
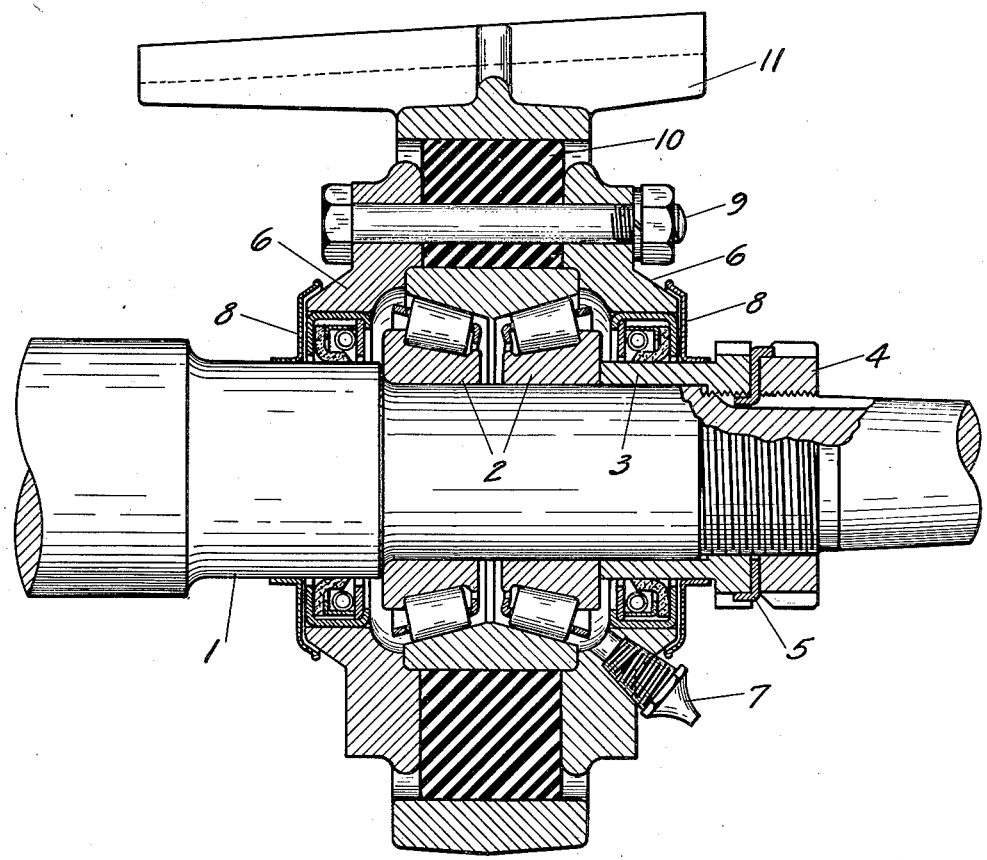
R. HENRY     INVENTOR.
BY Merrill M. Blackburn.
                ATTORNEY.

Patented Feb. 9, 1937

2,070,081

UNITED STATES PATENT OFFICE 2,070,081

BEARING SUPPORT

Raymond Henry, Rock Island, Ill.

Application July 29, 1935, Serial No. 33,702

5 Claims. (Cl. 308—184)

The present invention relates to self adjusting supports for bearings and more particularly bearings of the roller type, although it is not limited in use to that particular style of bearing. Among the objects of this invention are to provide apparatus which will permit a bearing to automatically adjust itself so as to eliminate strains due to misalignment and other causes; to provide a support for a shaft bearing which will permit the bearing to adjust itself to the shaft, thus relieving any strains due to improper alignment; to provide means between a shaft and its bearing supports which will automatically compensate for irregularities in mounting, as concerns the shaft and its bearing support; and such further objects, advantages, and capabilities as will hereafter appear and as are inherent in the construction disclosed herein. My invention further resides in the combination, construction, and arrangement of parts illustrated in the accompanying drawing and, while I have shown therein what is now considered the preferred embodiment of this invention, I desire the same to be understood as illustrative only and not to be interpreted in a limiting sense.

The drawing annexed hereto and forming a part hereof represents a shaft and its bearing support, regardless of the type of either, the shaft being represented in a fragmentary manner and the bearing and bearing support in longitudinal section.

In the drawing annexed hereto, the shaft 1 is shown as supported in a roller bearing 2 of standard and well known type. This bearing is held in place by means of a sleeve 3 and lock nut 4, as is common practice. Between these is a locking washer 5 which prevents the sleeve 3 from inadvertently rotating. Clamping rings 6 have grease retainers between them and the shaft to prevent, as far as possible, the grease from leaving the bearing. A grease fitting 7 of any suitable type is mounted in one of the rings 6 and provides means for lubricating the bearing. Outside of the lubricant seal are flanged rings 8 which tend to keep water and dirt from passing into the seal and possibly from there into the bearing.

The rings 6 are drawn together by means of bolts 9 and engage the opposite sides of a compressible ring 10, preferably made of rubber. This ring 10 connects the bearing 2 to the bearing support 11 and permits the bearing to adjust itself in the support in accordance with the position of the shaft 1. In other words, if the axis of the shaft 1 is not coincident with the axis of the bearing 2, these two can yield relatively to each other so as to permit the axes to become coincident. This shaft may be either a fixed or a rotating shaft and, in the former case, the bearing support will rotate about the fixed shaft, while in the latter case, the shaft will rotate within the support. In either event, the rubber permits the two to automatically adjust themselves to each other.

It is of course understood that the specific description of structure set forth above may be departed from without departing from the spirit of my invention as set forth in this specification and the appended claims.

Having now described my invention, I claim:

1. In combination, a relatively rotary shaft and support, a yielding cushioning means between the shaft and support, an anti-friction bearing between the shaft and cushioning means and engaged by the latter, and a cage laterally enclosing the bearing and most of the cushioning means, said cage having relatively movable sides of less diameter than the external diameter of the cushioning means, and means extending through said sides and cushioning means to draw the sides of the cage against the cushioning means and cause expansion thereof against the bearing and the support and thus secure the two together.

2. The combination of a substantially horizontal shaft and a support therefor, one of said parts being rotatable, an antifriction bearing between said shaft and said support and permitting relative rotation of one with respect to the other, and yielding connecting means between the shaft and its support, and in the same region longitudinally of the shaft as said bearing, to enable one to move relatively to the other otherwise than by rotation and reciprocation, and clamping members laterally gripping the yielding connecting means and forcing same into tight engagement with the support and bearing to hold them assembled, said clamping means being at all times out of contact with the support.

3. In a support for a rotary shaft, an antifriction bearing for the shaft, including a cage to grip and hold the bearing in place, flexible means held by the cage and engaging the bearing externally, and supporting means for the flexible means to so hold said flexible means that the bearing may move bodily to permit accommodation of position of the shaft, said flexible means being compressed by the cage so as to tightly grip the bearing and the supporting means and hold them assembled.

4. In combination, hollow supporting means, rubber cushioning means therein, a bearing supported by the rubber cushioning means, a shaft in said bearing, the cushioning means enabling relative vibratory and torsional movements between the shaft and the hollow supporting means, and clamping means upon opposite sides of the rubber cushioning means to compress it so it will have tight engagement with the supporting means and the bearing whereby to prevent slippage of the cushioning means with relation to either of the other parts, said clamping means having a less external diameter than that of the cushioning means.

5. In combination, a relatively rotary shaft and support, a yielding cushioning means between the shaft and support, an antifriction bearing between the shaft and cushioning means and engaged by the latter, and a cage laterally enclosing the bearing and most of the cushioning means, said cage having relatively movable sides and means extending through said sides and cushioning means to draw the sides of the cage against the cushioning means and cause expansion thereof against the bearing and the support and thus secure the two together, the cage having an outside diameter less than the opening in the support in which the cushioning means is received.

RAYMOND HENRY.